G. Anderson,
Making Sheet-Metal Boxes.
Nº 47,689. Patented May 16, 1865.
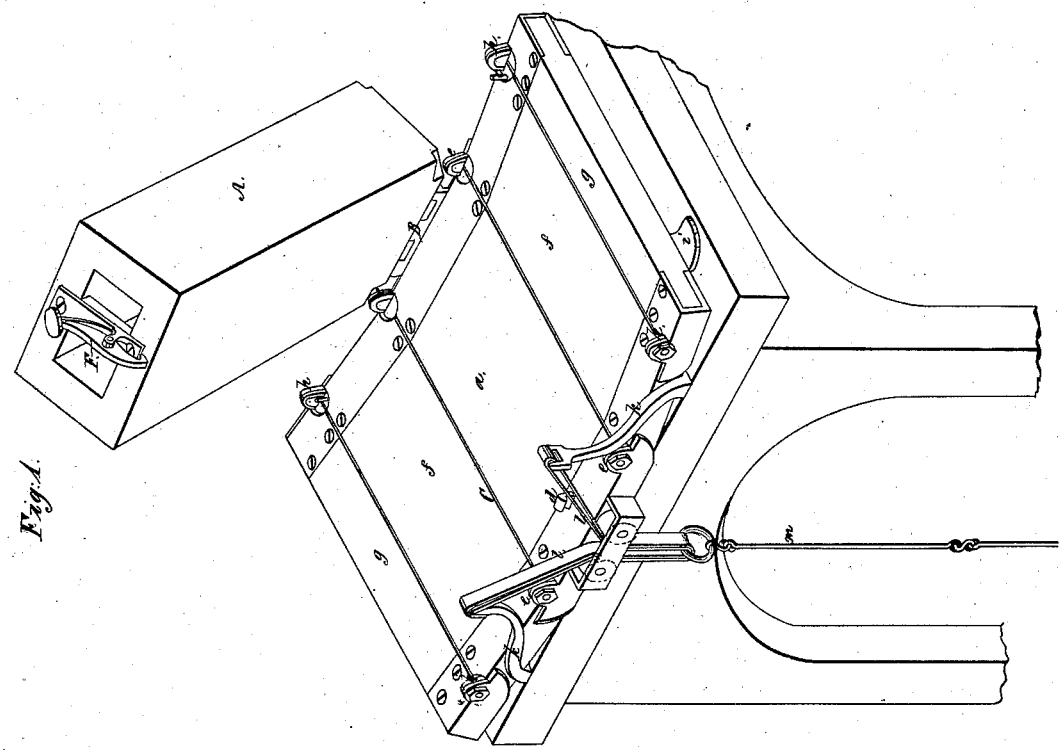
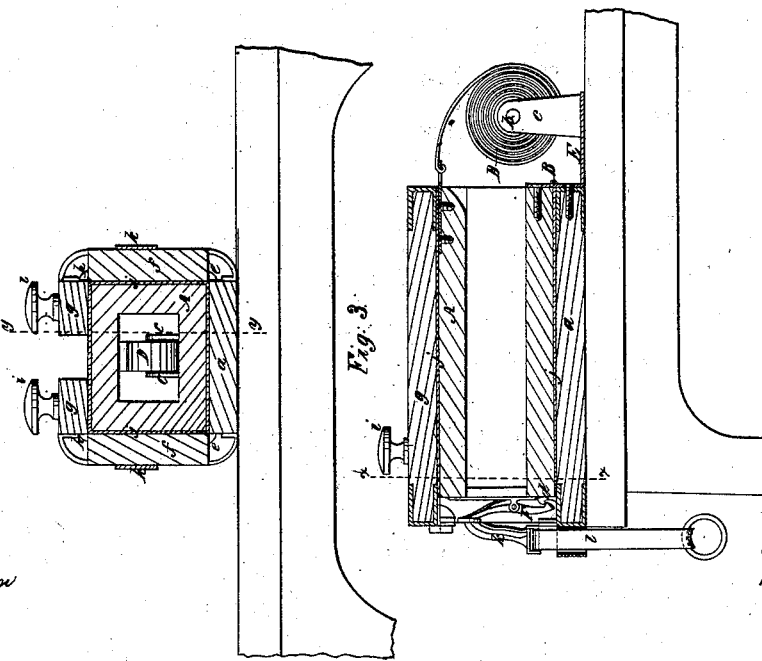
Witnesses:
Theo Tusch
Wm Freeuw
Inventor:
George Anderson
per Munn & Co
attys.

UNITED STATES PATENT OFFICE.

GEORGE ANDERSON, OF SALEM, OREGON.

IMPROVEMENT IN MAKING SHEET-METAL BOXES.

Specification forming part of Letters Patent No. 47,689, dated May 16, 1865.

*To all whom it may concern:*

Be it known that I, GEORGE ANDERSON, of Salem, in the county of Marion and State of Oregon, have invented a new and Improved Device for Making Rectangular Sheet-Metal Boxes; and I do hereby declare that the following is a full, clear, and exact description thereof, which will enable those skilled in the art to make and use the same, reference being had to the accompanying drawings, forming part of this specification, in which—

Figure 1, Sheet No. 1, is a perspective view of my invention; Fig. 2, Sheet No. 2, a transverse vertical section of the same, taken in the line $x\,x$, Fig. 3; Fig. 3, Sheet No. 2, a longitudinal vertical section of the same, taken in the line $y\,y$, Fig. 2.

Similar letters of reference indicate corresponding parts.

This invention relates to a new and improved machine for constructing or forming the bodies of sheet-metal boxes, whereby the work may be done rapidly and in a perfect manner.

The invention consists in the employment or use of a mold corresponding in size and shape to the bodies of the boxes to be made, and having a spring attached to it, and connected by a hinge to a jointed or folding form, the latter having a treadle applied to it, all arranged so as to effect the desired end.

A represents what I term a "mold," which is of retangular form corresponding in dimensions to the bodies of the boxes to be manufactured. One end of this mold A is attached by a hinge or joint, B, to one end of a plate, $a$, which comprises one of the parts of a form, C. The hinge or joint B is attached to the lower part of the end of the mold A, and to the upper part of said end a coil-spring, D, is attached, the latter being connected at its inner end to a shaft, $b$, fitted in uprights $c$ on a plate, E, which is attached to the same end of the plate $a$ as the hinge or joint B. The spring D has a tendency to keep the free or disengaged end of the mold A thrown upward, as shown in Fig. 1, Sheet No. 1.

At the end of the mold A opposite to that where the hinge or joint B is attached there is a catch, F, which, when the form is pressed down, engages with a hook or lip, $d$, on the plate $a$, and secures the mold down on the latter, as shown in Fig. 3. The plate $a$ of the form C is equal in width to the mold A, and to each side of the plate $a$ there is attached, by joints or hinges $e$, a plate, $f$, the latter being equal in width to the sides of the mold A, the hinges $e$ admitting of the plates $f$ being turned up in contact with the sides of the mold, as shown in Fig. 2, Sheet No. 2. The plates $f$ have each a narrow plate, $g$, attached to their outer edges by hinges $h$, which, when the plates $f\,f$ are turned up in contact with the sides of the mold A, may be folded down on the top thereof. Each plate $g$ is provided with a knob, $i$. The plates $a\,f\,f\,g\,g$ comprise the form, and each plate $f$ has an arm, $k$, attached to it, said arms extending out in front of the plates $f\,f$, and connected by straps $l\,l$ to a chain, $m$, the latter at its lower end being attached to a treadle. (Not represented.)

The operation is as follows: The form C is spread out flatwise on a suitable bench or support, and the mold A, being liberated from the lip $d$, is thrown upward by the spring D, as shown in Fig. 1. The sheet-metal of which the bodies of the boxes are made are cut of the proper size and laid one at a time on the form C, the center of the plate being over the center of the plate $a$ of the form. The operator then presses down the mold A upon the plate, the catch F engaging with the lip $d$, and forces down the treadle with his foot, the chain $m$, through the medium of the straps $l\,l$ and arms $k\,k$, drawing up the plates $f\,f$ and bending the metal plate (designated by $j$) in contact with the sides of the mold A. The two narrow plates $g\,g$ are then turned down and the ends of the plate $j$ are bent down on the top of mold A. (See Fig. 2, Sheet No. 2.) This completes the operation, the form C being then unfolded and the mold A released from the plate $a$, so that the spring D will throw up its free or disengaged end, and the body of the box removed from the mold and the seam soldered, another plate being laid on the form C for a succeeding operation. Thus by this simple device the bodies of sheet-metal boxes may be rapidly made and in a perfect manner and by any one of ordinary ability. The lids and bottoms may be secured to the bodies in the usual or any proper way.

I claim as new and desire to secure by Letters Patent—

1. The mold A, in combination with the form C, the latter being composed of the plates *a f f g g*, connected by hinges *e h*, and the mold being attached to the plate *a* of C by a hinge, B, all arranged substantially as and for the purpose set forth.

2. The spring D, in the described combination with the hinged block A, for raising the same automatically, as explained.

3. The arms *k k*, in the described combination with the hinged plates *f f*, for the purpose specified.

GEORGE ANDERSON.

Witnesses:
W. K. RIGBY,
BENJ. STRANG.